(12) United States Patent
Tang et al.

(10) Patent No.: US 12,347,057 B2
(45) Date of Patent: Jul. 1, 2025

(54) METHOD AND APPARATUS FOR GENERATING MAIN CONTROL OBJECT PROJECTION, DEVICE, AND MEDIUM

(71) Applicant: Tencent Technology (Shenzhen) Company Limited, Shenzhen (CN)

(72) Inventors: Jie Tang, Shenzhen (CN); Shuchang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 199 days.

(21) Appl. No.: 18/221,812

(22) Filed: Jul. 13, 2023

(65) Prior Publication Data

US 2023/0360348 A1    Nov. 9, 2023

Related U.S. Application Data

(63) Continuation of application No. PCT/CN2022/126147, filed on Oct. 19, 2022.

(30) Foreign Application Priority Data

Jan. 7, 2022    (CN) .......................... 202210015247.5

(51) Int. Cl.
  G06T 19/00    (2011.01)
  G06T 13/40    (2011.01)
  G06T 19/20    (2011.01)

(52) U.S. Cl.
  CPC .............. *G06T 19/20* (2013.01); *G06T 13/40* (2013.01); *G06T 2219/2016* (2013.01)

(58) Field of Classification Search
  None
  See application file for complete search history.

(56) References Cited

U.S. PATENT DOCUMENTS

| | | | |
|---|---|---|---|
| 6,532,015 B1* | 3/2003 | Hayashi | A63F 13/52 |
| | | | 345/474 |
| 6,700,586 B1* | 3/2004 | Demers | G06T 15/04 |
| | | | 345/474 |
| 2011/0244956 A1* | 10/2011 | Sakakibara | A63F 13/213 |
| | | | 463/31 |

FOREIGN PATENT DOCUMENTS

| | | |
|---|---|---|
| CN | 112206525 A | 1/2021 |
| CN | 112927332 A | 6/2021 |
| CN | 114359469 A | 4/2022 |

(Continued)

OTHER PUBLICATIONS

Tencent Technology, IPRP, PCT/CN2022/126147, Jun. 20, 2024, 5 pgs.

(Continued)

*Primary Examiner* — Martin Mushambo
(74) *Attorney, Agent, or Firm* — Morgan, Lewis & Bockius LLP

(57) ABSTRACT

This application discloses a method for rendering a projection of a main control object in a virtual environment performed by a computer device and relates to the technical field of animation. The method includes: obtaining an original bone model of the main control object from an animation blueprint of the main control object; obtaining a projection model based on the original bone model and a posture of the main control object; generating a projection of the main control object in the virtual environment based on the projection model; and rendering the projection of the main control object in the virtual environment.

20 Claims, 12 Drawing Sheets

Extracting an original bone model of a main control object from an animation blueprint of the main control object, wherein the main control object is an object that observes a virtual environment from a first person perspective, the animation blueprint is used for generating a model of the main control object in the virtual environment, and the original bone model is a model of the main control object without bone deformation — 602

Adjusting a posture of the original bone model based on a current state of the main control object to obtain a projection model, wherein the projection model is a model used for generating a projection of the main control object in the virtual environment — 604

Rendering the projection model to obtain a projection of the main control object — 606

(56) References Cited

FOREIGN PATENT DOCUMENTS

| | | |
|---|---|---|
| JP | H 11306384 A | 11/1999 |
| JP | 2001067490 A | 3/2001 |
| JP | 2004334662 A | 11/2004 |
| JP | 2011215920 A | 10/2011 |
| JP | 2014509429 A | 4/2014 |

OTHER PUBLICATIONS

Tencent Technology, Japanese Office Action, JP Patent Application No. 2023-566962, Sep. 17, 2024, 4 pgs.
Tencent Technology, ISR, PCT/CN2022/126147, Jan. 11, 2023, 2 pgs.
Tencent Technology, WO, PCT/CN2022/126147, Jan. 11, 2023, 4 pgs.

* cited by examiner

METHOD AND APPARATUS FOR GENERATING MAIN CONTROL OBJECT PROJECTION, DEVICE, AND MEDIUM

CROSS-REFERENCE TO RELATED APPLICATIONS

This application is a continuation application of PCT Patent Application No. PCT/CN2022/126147, entitled "METHOD AND APPARATUS FOR GENERATING MAIN CONTROL OBJECT PROJECTION, DEVICE, AND MEDIUM" filed on Oct. 19, 2022, which claims priority to Chinese patent application No. 202210015247.5, entitled "METHOD AND APPARATUS FOR GENERATING MAIN CONTROL OBJECT PROJECTION, DEVICE, AND MEDIUM" filed on Jan. 7, 2022, all of which is incorporated herein by reference in its entirety.

FIELD OF THE TECHNOLOGY

This application relates to the field of animation technologies, and in particular, to a method and apparatus for rendering a projection of a main control object in a virtual environment, a device, and a medium.

BACKGROUND OF THE DISCLOSURE

In order to simulate a real environment in a virtual environment, a projection is added to a main control object of a user, to improve a realistic degree of the virtual environment.

The related art may provide two animation blueprints, where one is for generating a main control object, and the other is for generating a projection of the main control object. When a virtual object is generated, animation posture matching, bone scaling, and model detail optimization may be sequentially performed on a bone model of the main control object, to generate a model of the main control object. When the projection of the main control object is generated, animation posture matching and model detail optimization may be performed on the model of the main control object, to generate a projection model of the main control object.

In the related art, a calculation amount is large, and a requirement on a computer device is high.

SUMMARY

Embodiments of this application provide a method and apparatus for rendering a projection of a main control object in a virtual environment, a device, and a medium. The technical solutions are as follows:

According to one aspect of this application, a method for rendering a projection of a main control object in a virtual environment is provided, the method including:
  obtaining an original bone model of the main control object from an animation blueprint of the main control object;
  obtaining a projection model based on the original bone model and a posture of the main control object;
  generating a projection of the main control object in the virtual environment based on the projection model; and
  rendering the projection of the main control object in the virtual environment.

According to another aspect of this application, a computer device is provided, the computer device including: a processor and a memory, where the memory stores at least one instruction, at least one program, code set or instruction set, and the at least one instruction, at least one program, code set or instruction set are loaded and executed by the processor and cause the computer device to implement a method for rendering a projection of a main control object in a virtual environment as described in the above aspect.

According to another aspect of this application, a non-transitory computer-readable storage medium is provided. The computer-readable storage medium stores at least one piece of program code, and the program code is loaded and executed by a processor to implement a method for rendering a projection of a main control object in a virtual environment as described in the above aspect.

The beneficial effects brought by the technical solutions provided in the embodiments of this application at least include:

When the projection of the main control object is generated, the projection of the main control object can be obtained based on the original bone model only by extracting the original bone model from the animation blueprint. Compared with the related art, which uses two sets of different animation blueprints to obtain the and projection of the main control object at the same time, the method can obtain the projection of the main control object without setting an additional set of animation blueprint, can simplify the process of obtaining the projection of the main control object, can obtain the projection of the main control object without excessive calculation amount, reduces the calculation pressure of the computer device, and can complete the projection of the main control object even if the computing capability of the computer device is weak.

DESCRIPTION OF EMBODIMENTS

First, terms involved in the embodiments of this application are introduced:

Main control object: it refers to a user-controlled movable object that observes a virtual environment from a first-person perspective. The movable object can be a virtual character, a virtual animal, a cartoon character, and the like, such as: characters, animals, plants, oil drums, walls, and stones displayed in the virtual environment. In some embodiments, When the virtual environment is a 3D virtual environment, virtual objects are 3D stereo models created based on an animation bone technology, and each virtual object has its own shape and volume in the 3D virtual environment, occupying a part of the space in the three-dimensional virtual environment. In some embodiments, When the virtual environment is a two-dimensional virtual environment, the virtual objects are two-dimensional plane models created based on an animation technology, and each virtual object has its own shape and area in the two-dimensional virtual environment, occupying a part of the area in the two-dimensional virtual environment.

FPS (First Person Shooting game) Game: it is a game which provides a plurality of forts in the virtual world, and users in different camps control virtual characters to battle in the virtual world, occupy the forts or destroy forts of opposing camps or kill all or part of characters of the opposing camps. Generally, in a FPS game, a user plays a game from a first-person perspective. For example, the FPS game may divide users into two opposing camps and spread the virtual characters controlled by the users to compete with each other in the virtual world, so as to kill all the virtual characters of the enemy as a victory condition. The FPS game is in units of a round. A duration of one round of the FPS game is from the moment of the start of the game to the moment of achievement of the victor condition.

Figure 1:
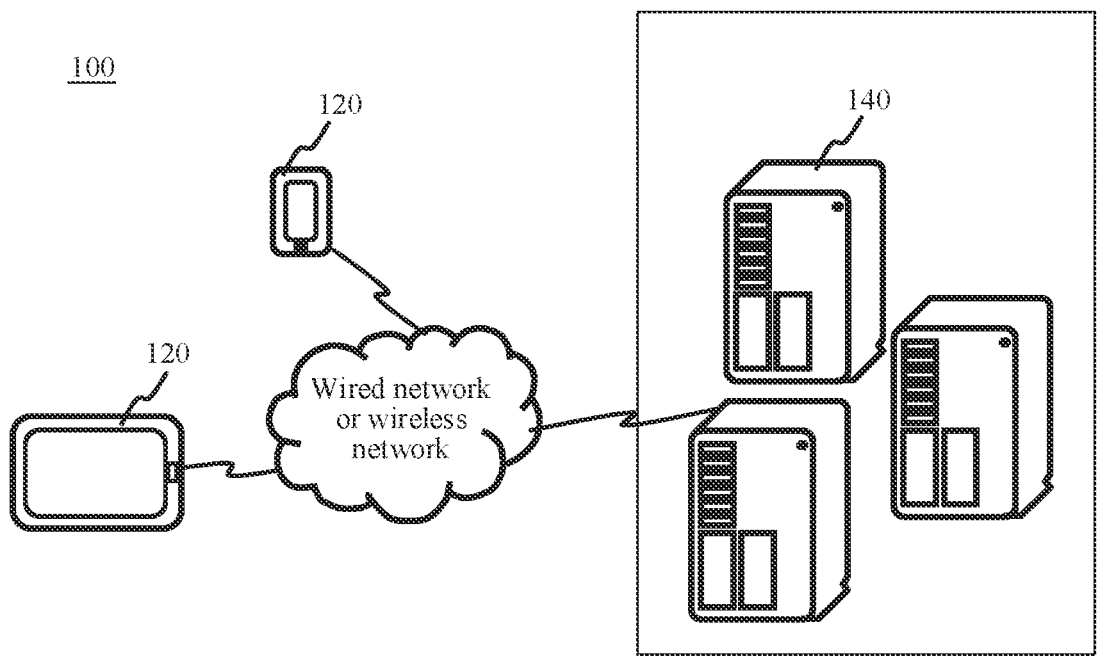
FIG. 1 is a schematic structural diagram of a computer system according to an exemplary embodiment of this application.

FIG. 1 shows a schematic structural diagram of a computer system 100 according to an exemplary embodiment of this application. The computer system 100 includes: a terminal 120 and a server 140.

An application program supporting a virtual environment is installed on the terminal 120. The application program may be any one of an FPS game, a racing game, an MOBA (Multiplayer Online Battle Arena) game, a virtual reality application program, a 3D map program, and a multiplayer gunfight type survival game. The user uses the terminal 120 to operate a main control object located in the virtual environment to perform activities including but not limited to: at least one of attacking, releasing skills, purchasing props, treating, adjusting body postures, crawling, walking, riding, flying, jumping, driving, picking, shooting, and throwing. Indicatively, a first virtual role is a first virtual character. The terminal 120 is at least one of a smart phone, a tablet computer, an e-book reader, an MP3 player, an MP4 player, a laptop portable computer, and a desktop computer.

The terminal 120 is connected to the server 140 by using a wireless network or a wired network.

The server 140 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN (Content Delivery Network), big data and an artificial intelligence platform. The server 140 is configured to provide a backend service for an application program supporting a virtual environment. In some embodiments, the server 140 is responsible for primary computing work and the terminal 120 is responsible for secondary computing work; alternatively, the server 140 is responsible for the secondary computing work and the terminal 120 is responsible for the primary computing work; alternatively, a distributed computing architecture is adopted between the server 140 and the terminal 120 to perform collaborative computing.

Figure 2:
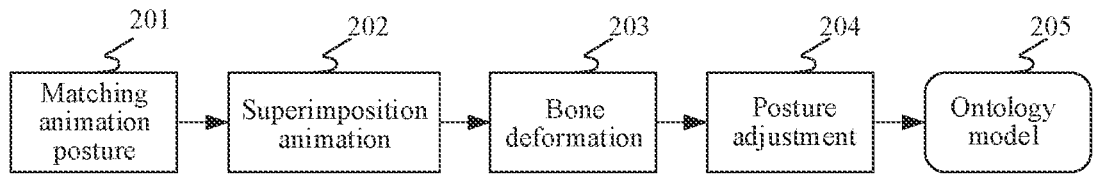
FIG. 2 is a schematic diagram of a related art according to an exemplary embodiment of this application.

When displaying the main control object, the related art may be implemented according to the following steps, as shown in FIG. 2:

matching animation posture 201: determining animation postures of different parts of the main control object. The matching animation posture 201 is used to determine the animation posture of the main control object. In some embodiments, When the main control object is active, the animation posture of the main control object is determined. Illustratively, activities include but are not limited to at least one of walking, running, jumping, standing, squatting, lying, attacking, flying, driving, picking, shooting, and throwing. In some embodiments, matching animation posture 201 may match the animation postures of different parts of the main control object. For example, if the main control object runs while shooting, it is necessary to match the animation posture of shooting with the upper body of the main control object and match the animation posture of running with the lower body of the main control object.

Superimposition animation 202: the animation postures of different parts of the main control object are superimposed to obtain the animation postures of the main control object. The superimposition animation 202 is used to process the animation superimposition of different parts of the main control object. Illustratively, the animation posture of the upper body and the animation posture of the lower body of the main control object are superimposed to obtain the animation posture of the main control object.

Figure 3:
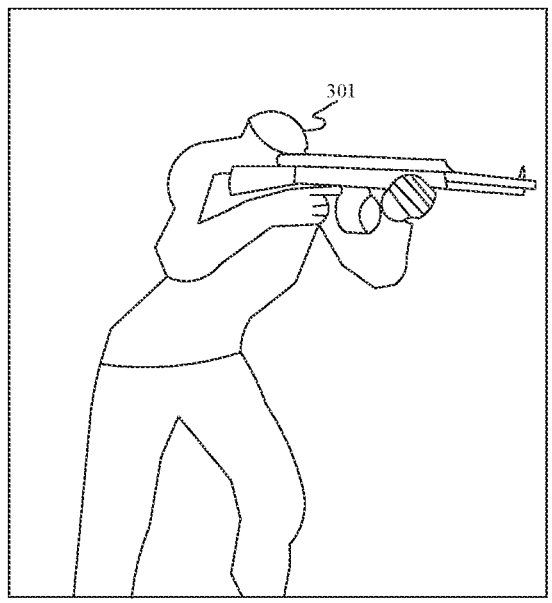
FIG. 3 is a schematic diagram of an of a main control object according to an exemplary embodiment of this application.

Bone deformation 203: a bone model of the main control object is adjusted to obtain a deformed bone model. The bone deformation 203 is used to adjust the bone shape of the main control object. In some embodiments, the manner of the bone deformation 203 includes but is not limited to at least one of changing bone position, changing bone orientation, and scaling bone. Illustratively, on the one hand, the bone of the head of the main control object is scaled in order to prevent the head of the main control object from penetrating the model when the main control object is displayed. On the other hand, when the main control object leans to the left and right, the main control object may be distorted excessively, so that the main control object can complete the leaning action. As shown in FIG. 3, when the main control object 301 is viewed from a third person perspective, the head of the main control object 301 is scaled (removed) and the body of the main control object 301 is in an excessively twisted state.

Adjustment posture 204: based on the current state of the main control object, the posture of the deformed bone model is adjusted. The adjustment posture 204 is used to adjust the posture of the main control object to improve accuracy. Illustratively, the posture of the main control object's hand is adjusted by reverse dynamics to improve the accuracy of holding a prop by the main control object.

After the adjustment posture 204 is completed, a model 205 of the main control object is output and the model 205 is configured to generate an of the main control object.

Figure 4:
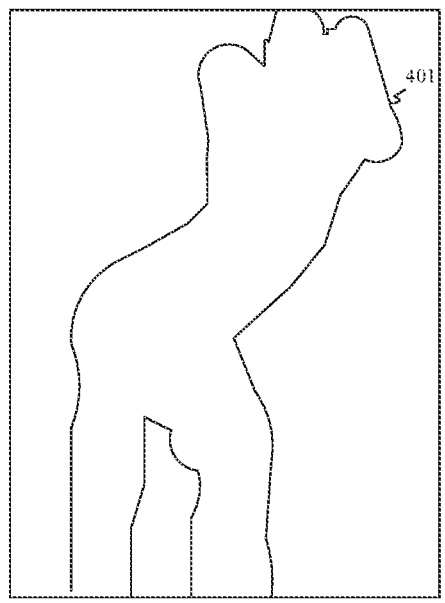
FIG. 4 is a schematic diagram of a projection of a main control object according to an exemplary embodiment of this application.

It should be noted that, the method of displaying the of the main control object cannot be directly transplanted to a projection of displaying the main control object. Illustratively, if the projection of the main control object is generated by using the above method, the projection 401 shown in FIG. 4 is obtained and the shape of the projection 401 is obviously inconsistent with the actual situation. This is because the step of the bone deformation 203 may cause bone deformation of the main control object. On the one hand, scaling the head of the main control object, on the other hand, distorting the main control object, resulting in the bone of the main control object being different from the actual bone. However, the step of the bone deformation 203 cannot be skipped when the model of the main control object is generated. If the step of the bone deformation 203 is skipped, on the one hand, if the head is not scaled in the bone deformation 203, the head of the main control object and a camera model of the main control object may affect each other, resulting in a phenomenon of model penetration. On the other hand, when the main control object leans to the left and right, if the main control object is not distorted enough, it is difficult to realize a leaning of the main control object.

Figure 5:
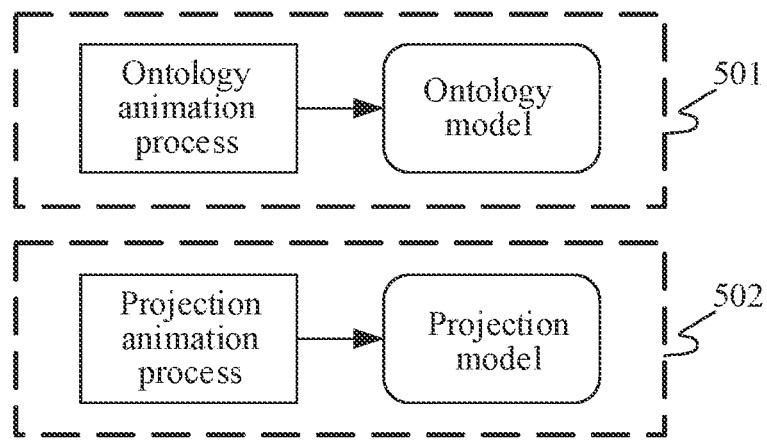
FIG. 5 is a schematic diagram of a related art according to an exemplary embodiment of this application.

Therefore, the related art may run two different processes in the computer device to realize the display of the and the projection of the main control object respectively. Illustratively, as illustrated in FIG. 5, a first process 501 is used to generate an of the main control object and a second process 502 is used to generate a projection of the main control object. However, the inventor found that other problems may be caused. Because it is necessary to calculate two different processes for one main control object, and the two processes cannot be optimized by other means such as frequency reduction, it is impossible for computer devices with limited computing capability, such as a mobile phone, to display the and the projection of the main control object at the same time in this manner. In addition, for those computer devices with strong computing capability, it is easy to cause the process processing time to be too long because of thread waiting.

In order to resolve the above problems: 1. The of the main control object and the projection of the main control object are not compatible in an implementation, two sets of different methods are needed to obtain the of the main control object and the projection of the main control object respectively; 2. The generation of the of the main control object and the projection of the main control object at the same time requires the computer device to have strong computing capability and the generation of the of the main control object and the projection of the main control object cannot be realized by some terminals with weak computing capability at the same time.

Figure 6:
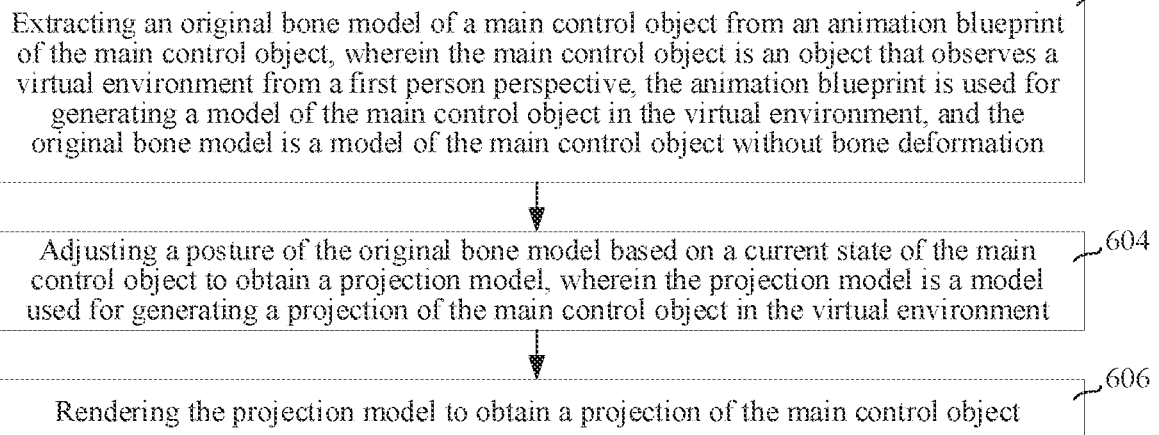
FIG. 6 is a schematic flowchart of a method for rendering a projection of a main control object in a virtual environment according to an exemplary embodiment of this application.

FIG. 6 shows a schematic flowchart of a method for rendering a projection of a main control object in a virtual environment according to an embodiment of this application. The method may be performed by the terminal 120 shown in FIG. 1, the method including the following steps:

Step 602: an original bone model of a main control object is extracted from an animation blueprint of the main control object, where the main control object is an object that observes a virtual environment from a first-person perspective, the animation blueprint is used to generate a model of the main control object in the virtual environment, and the original bone model is a model of the main control object without bone deformation.

The main control object can be at least one of virtual characters, virtual animals, and cartoon characters. This is not specifically limited in this application. Illustratively, a user controls a main control object in an FPS game and the user controls the main control object from the first-person perspective.

In some embodiments, the animation blueprint includes bone deformation processing. The bone deformation processing is used to modify the bone of the main control object to avoid the main control object penetrating the model. Illustratively, when the bone model of the main control object is deformed, the head bone of the main control object is scaled, and the model at this time is not suitable for generating the projection of the main control object, so the model without the bone deformation is used as the original bone model.

In some embodiments, the animation blueprint includes the steps shown in the embodiment shown in FIG. 2.

The animation blueprint is a process of generating a model of a main control object in a virtual environment (alternatively, it can also be called an animation blueprint is a process of generating an of a main control object in a virtual environment). The of the main control object can be obtained through the animation blueprint. The of main control object refers to the main control object in the virtual environment.

Step 604: a projection model is obtained based on the original bone model and the projection model is a model configured to generate a projection of the main control object in the virtual environment.

In one embodiment, the original bone model is directly used as the projection model. It should be noted that, Because the requirement of the projection accuracy of the main control object is often not high, when the terminal performance is more emphasized, the original bone model can be directly used as the projection model.

In one embodiment, the posture of the original bone model is adjusted based on the current state of the main control object to obtain a projection model. It should be noted that, If the projection accuracy of the main control object is further pursued, the original bone model can be further adjusted according to the current state of the main control object.

In some embodiments, the current state includes but is not limited to at least one of attacking, releasing skills, purchasing props, treating, adjusting body postures, crawling, walking, riding, flying, jumping, driving, picking, shooting, throwing, running and resting. Illustratively, if the main control object is in a walking state, the posture of the original bone model is adjusted to a walking posture.

In some embodiments, when the state of the main control object changes, the projection model is obtained by adjusting the posture of the original bone model based on the changed state. Illustratively, if the main control object is changed from a static state to a running state, the main control object is changed from a static posture to a running posture.

In some embodiments, the posture of the original bone model is adjusted based on a periodic change. For example, when the main control object moves both feet alternately in the walking state, the posture of the original bone model is changed based on the periodic alternate movement of both feet.

Illustratively, based on the current state of the main control object, the posture of the original bone model is adjusted by reverse dynamics to obtain a projection model.

It should be noted that, due to the nature of projection, the accuracy of the projection of the main control object is low. Therefore, an adjustment operation of the posture for the original bone model can be cancelled and the adjustment operation of the posture is used to improve the projection accuracy of the main control object. For example, when the main control object turns around at a small angle, there is footstep logic adjustment, which is used to improve the fineness of the performance. However, because the projection accuracy of the main control object is low, the footstep logic adjustment is reflected even if the footstep logic adjustment is performed, so that the footstep logic adjustment can be cancelled to reduce the calculation amount of the computer device.

Therefore, in some practical scenarios, the steps of posture adjustment to the original bone model can be reduced. For example, the above-mentioned footstep logic adjustment can be cancelled, or a hand detail adjustment can be cancelled.

Step 606: the projection model is rendered to obtain the projection of the main control object.

In some embodiments, the projection of the main control object is a projection of the main control object on the backlight side of the virtual environment. Illustratively, the projection of the main control object is a projection on the ground in the virtual environment, or the projection of the main control object is a projection on a wall in the virtual environment, or the projection of the main control object is a projection on a ceiling in the virtual environment.

In some embodiments, the projection of the main control object can also refer to an image on a reflecting surface. For example, the projection of the main control object refers to an image of the main control object on a mirror surface, and for example, the projection of the main control object refers to an image of the main control object on a water surface.

Figure 7:
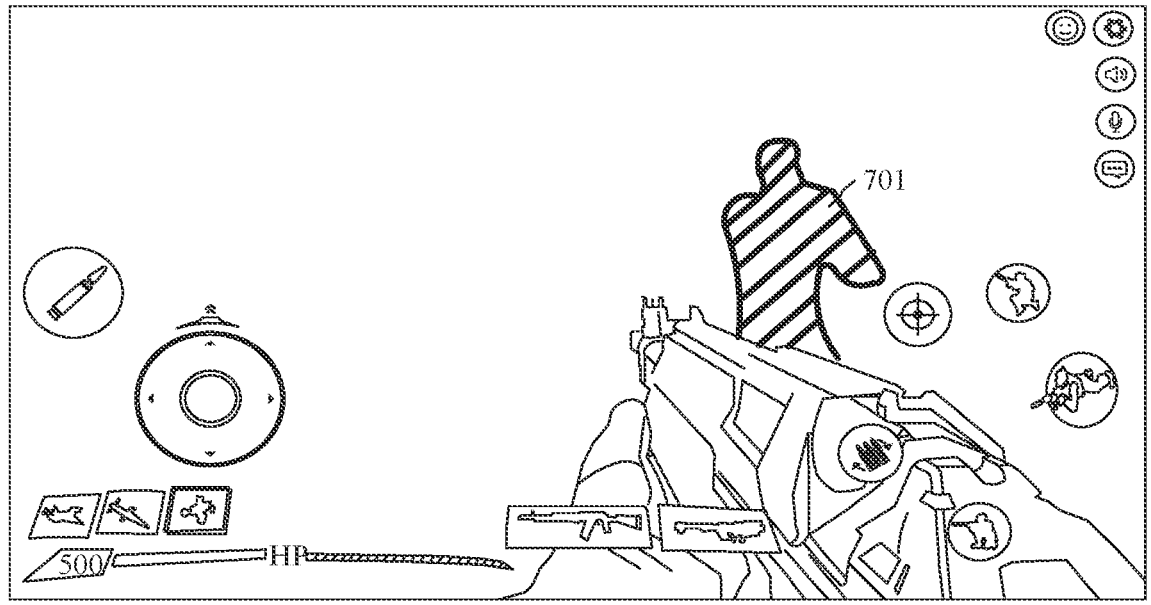
FIG. 7 is a schematic diagram of an of a main control object according to an exemplary embodiment of this application.
Figure 8:
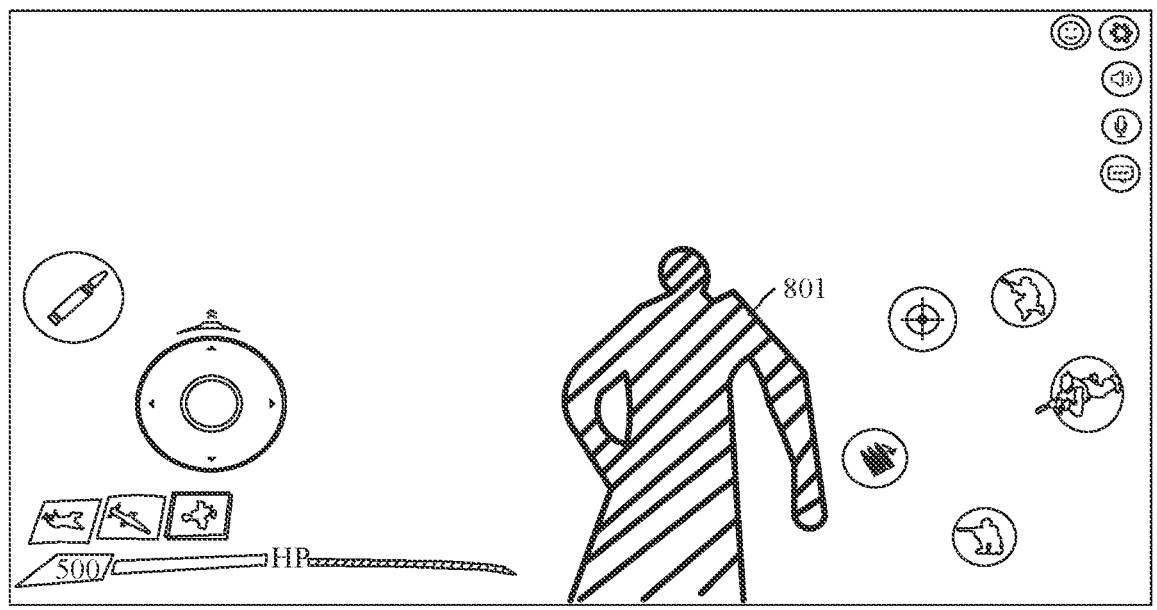
FIG. 8 is a schematic diagram of a projection of a main control object according to an exemplary embodiment of this application.

Illustratively, as shown in FIG. 7, FIG. 7 shows a projection 701 of a main control object on the ground with the main control object holding a virtual firearm. Illustratively, as shown in FIG. 8, FIG. 8 shows a projection 801 of a main control object on the ground with the main control object switching virtual firearms. As can be clearly seen from FIG. 7 and FIG. 8, the projection 701 and the projection 801 of the main control object are in accordance with the actual situation and can restore the projection of the main control object well.

In a specific implementation only 0.033 ms is consumed on the CPU when the method of the embodiment of this application is adopted to obtain the projection of the main control object, and 4.133 ms is consumed on the CPU when the related art is adopted to obtain the projection of the main control object. Obviously, the method of the embodiment of this application can effectively reduce the calculation time of the computer device and improve the efficiency.

To sum up, in the embodiment of this application, when the projection of the main control object is generated, only the original bone model is needed to extract from the animation blueprint and the projection of the main control object can be obtained based on the original bone model. The method can obtain the projection of the main control object without setting an additional set of animation blueprints, can simplify the process of obtaining the projection of the main control object, can obtain the projection of the main control object without excessive calculation amount, reduces the calculation pressure of the computer device, and can complete the projection of the main control object even if the computing capability of the computer device is weak.

Figure 9:
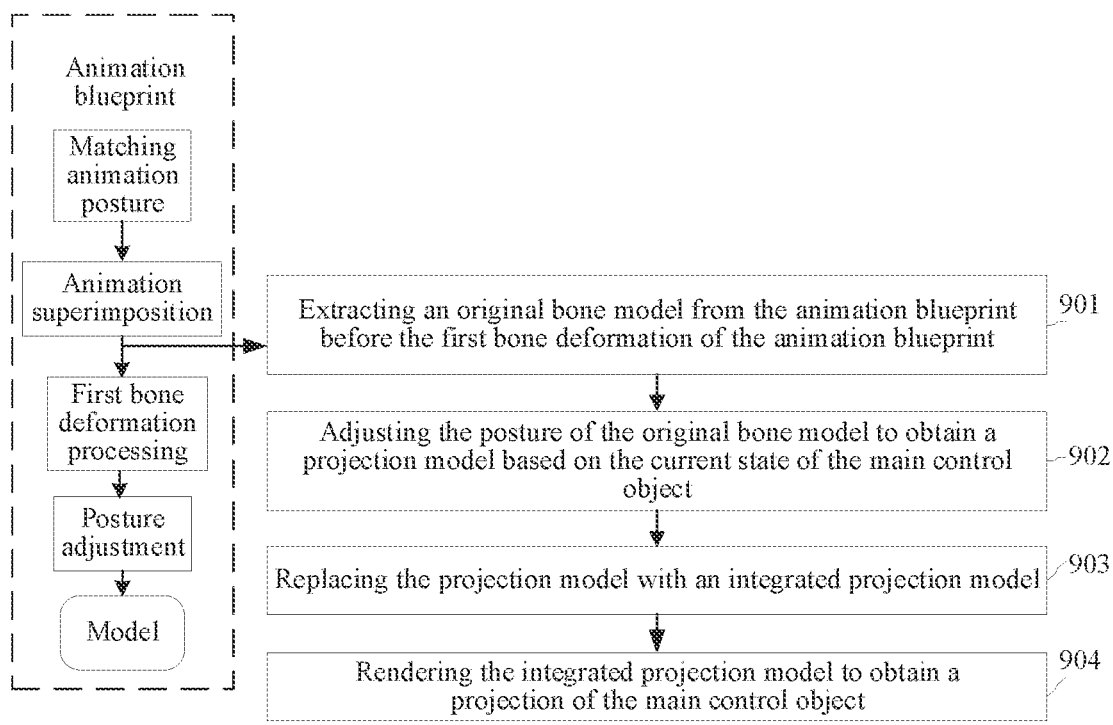
FIG. 9 is a schematic flowchart of a method for rendering a projection of a main control object in a virtual environment according to an exemplary embodiment of this application.

FIG. 9 shows a schematic flowchart of a method for rendering a projection of a main control object in a virtual environment according to an embodiment of this application. The method may be performed by the terminal 120 shown in FIG. 1, the method including the following steps:

Step 901: Before first bone deformation processing of the animation blueprint, the original bone model is extracted from the animation blueprint.

The first bone deformation processing is performed to scale a bone at an overlap region of a camera model and the original bone model of the main control object. Because the main control object is an object that observes the virtual environment from the first-person perspective, it is necessary to place the camera model on the head of the main control object to achieve the effect of the first person-perspective. However, also because the head of the main control object also has a model, this situation may lead to the appearance of model penetration. Therefore, the bone of the original bone model at an overlap region of the camera model and the original bone model of the main control object is scaled, so that the overlap region does not exist between the camera model and the original bone model and the appearance of model penetration is avoided.

In some embodiments, the first bone deformation processing is implemented by programming.

Step 902: Based on the current state of the main control object, the posture of the original bone model is adjusted to obtain the projection model.

Illustratively, based on the current state of the main control object, the posture of the original bone model is adjusted by reverse dynamics to obtain a projection model.

In some embodiments, When the state of the main control object changes, the projection model is obtained by adjusting the posture of the original bone model based on the changed state. Illustratively, if the main control object is changed from a static state to a running state, the main control object is changed from a static posture to a running posture.

In some embodiments, the posture of the original bone model is adjusted based on a periodic change. For example, when the main control object moves both feet alternately in the walking state, the posture of the original)one model is changed based on the periodic alternate movement of both feet.

Step 903: the projection model is replaced with an integrated projection model.

Figure 10:
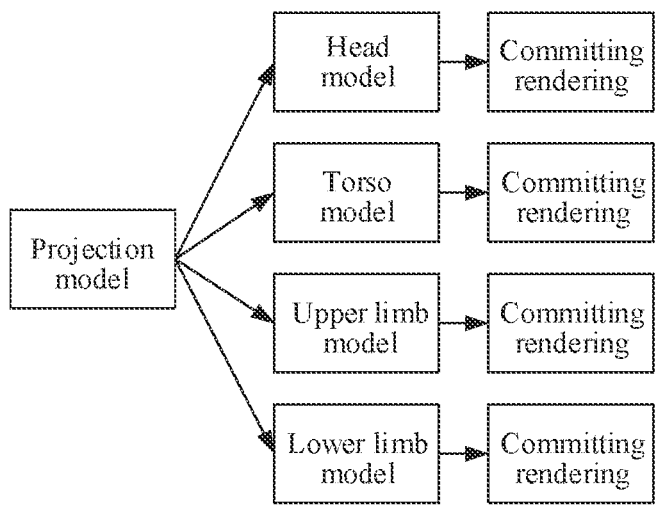
FIG. 10 is a schematic diagram of a rendered projection model according to an exemplary embodiment of this application.

In some embodiments, the projection model includes at least two component models, and the at least two component models include models of different parts on the main control object. For example, the component model includes at least one of a head model, a torso model, an upper limb model, and a lower limb model. When each component model is called for rendering, a draw call is generated and multiple draw calls are generated in total. Multiple draw calls may bring a great rendering pressure to GPU (Graphics Processing Unit) of the computer device. Illustratively, as shown in FIG. 10, when the component model includes a head model, a torso model, an upper limb model, and a lower limb model, at least four rendering calls need to be committed, which greatly increases the burden on the GPU.

Figure 11:
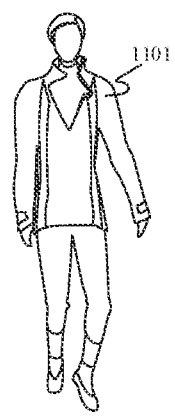
FIG. 11 is a schematic diagram of an integrated projection model according to an exemplary embodiment of this application.

Therefore, in the embodiment of this application, due to the characteristics of the projection, the accuracy of the projection of the main control object is not high, and even if there is a deviation, the accuracy of the projection is not affected. Therefore, the model includes at least two component models, the at least two component models include models of different parts on the main control object, the projection model is replaced with an integrated projection model, the integrated projection model is a low-surface model after merging at least two component models, and the number of surfaces of the integrated projection model is smaller than the number of surfaces of the projection model. In a specific implementation, the integrated projection model does not include the component model and the integrated projection model is composed of a complete model. Illustratively, as shown in FIG. 11, an integrated projection model 1101 of a main control object is shown in FIG. 11.

That is, when rendering the model, it is necessary to render at least two component models; However, when rendering the projection of the main control object, only the integrated projection model needs to be rendered and the number of faces of the integrated model is smaller than the number of faces of the model.

Figure 12:
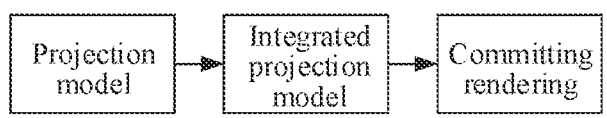
FIG. 12 is a schematic diagram of a rendered projection model according to an exemplary embodiment of this application.

Illustratively, as shown in FIG. 12, after replacing the projection model with the integrated projection model, the projection of the main control object can be obtained only by committing one rendering, which reduces the burden of the GPU.

Figure 13:
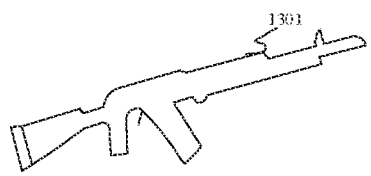
FIG. 13 is a schematic diagram of an integrated firearm model according to exemplary embodiment of this application.

In some cases, the main control object holds a virtual item. In order to reduce the rendering pressure of the GPU, the model of the virtual item held by the main control object can be replaced with an integrated item model. Illustratively, if the main control object holds a virtual firearm, the virtual firearm also includes at least two item component models (e.g., a stock model, a silencer model, and a grip model, etc.), and the model of the virtual firearm needs to be replaced with an integrated firearm model in order to render a firearm projection. As shown in FIG. 13, the firearm model including at least two item component models is replaced with an integrated firearm model 1301.

Step 904: the integrated projection model is rendered to obtain the projection of the main control object.

In some embodiments, the projection of the main control object is a projection on the backlight side in the virtual environment. Illustratively, the projection of the main control object is a projection on the ground in the virtual environment, or the projection of the main control object is a projection on a wall in the virtual environment, or the projection of the main control object is a projection on a ceiling in the virtual environment.

In some embodiments, the projection of the main control object can also refer to an image on a reflecting surface. For example, the projection of the main control object refers to an image of the main control object on a mirror surface, and for example, the projection of the main control object refers to an image of the main control object on a water surface.

To sum up, in the embodiment of this application, when the projection of the main control object is generated, the original bone model is extracted from the animation blueprint to obtain the projection of the main control object before the first bone deformation processing, so as to ensure that the generated projection has a head. Compared with the related art, which uses two sets of different animation blueprints to obtain the and the projection of the main control object at the same time, the method can obtain the projection of the main control object without setting an additional set of animation blueprint, can simplify the process of obtaining the projection of the main control object, can obtain the projection of the main control object without excessive calculation amount, and reduces the calculation pressure of computer device.

In addition, the projection model is replaced with an integrated projection model, which reduces the number of committing renderings of computer device and reduces the working pressure of the GPU.

Figure 14:
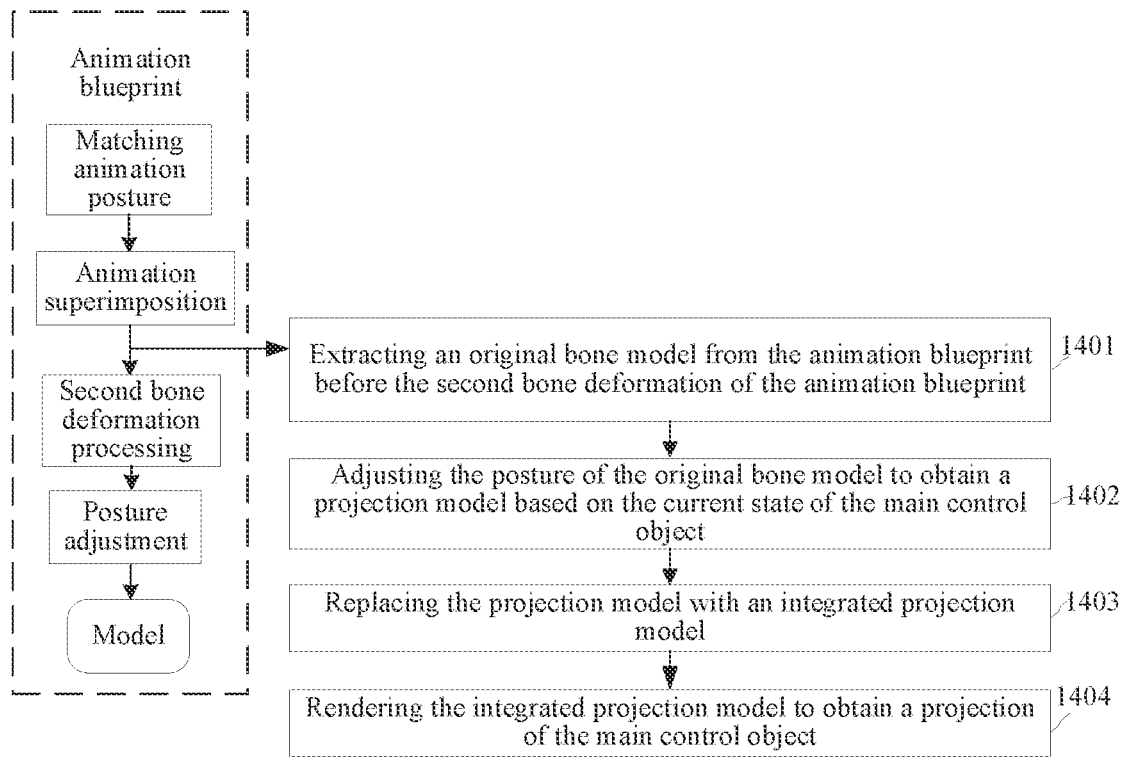
FIG. 14 is a schematic flowchart of a method for rendering a projection of a main control object in a virtual environment according to an exemplary embodiment of this application.

FIG. 14 shows a schematic flowchart of a method for rendering a projection of a main control object in a virtual environment according to an embodiment of this application. The method may be performed by the terminal 120 shown in FIG. 1, the method including the following steps:

Step 1401: before second bone deformation processing of the animation blueprint, the original bone model is extracted from the animation blueprint.

The second bone deformation processing is used to distort the original bone model when the main control object is in the target current state. In one specific example, when the main control object leans to the left and right, the bone model of the main control object may be distorted excessively, so that the main control object can lean behind an obstacle and observe other objects in the virtual environment after leaning, therefore the second bone deformation processing is needed. However, if the bone model is extracted after the second bone deformation processing, since the bone model has been excessively distorted, the resulting projection is also in an excessively distorted state. As shown in FIG. 4, the projection 401 of the main control object is in an excessively distorted state, but this excessively distorted state is not achievable by a normal human. Therefore, in this application, it is necessary to extract the original bone model from the animation blueprint before the second bone deformation processing of the animation blueprint.

Step 1402: based on the current state of the main control object, the posture of the original bone model is adjusted to obtain the projection model.

Illustratively, based on the current state of the main control object, the posture of the original bone model is adjusted by reverse dynamics to obtain a projection model.

In some embodiments, When the state of the main control object changes, the projection model is obtained by adjusting the posture of the original bone model based on the changed state. Illustratively, if the main control object is changed from a static state to a running state, the main control object is changed from a static posture to a running posture.

In some embodiments, the posture of the original bone model is adjusted based on a periodic change. For example, when the main control object moves both feet alternately in the walking state, the posture of the original bone model is changed based on the periodic alternate movement of both feet.

Step 1403: the projection model is replaced with an integrated projection model.

In some embodiments, the projection model includes at least two component models, and the at least two component models include models of different parts on the main control object. For example, the component model includes at least one of a head model, a torso model, an upper limb model, and a lower limb model.

The model includes at least two component models and the at least two component models include models of different parts on the main control object. The integrated projection model is a low-surface model after merging at least two component models, and the number of surfaces of the integrated projection model is smaller than the number of surfaces of the projection model. In a specific implementation, the integrated projection model does not include the component model and the integrated projection model is composed of a complete model. Illustratively, as shown in FIG. 11, an integrated projection model 1101 of a main control object is shown in FIG. 11.

In some cases, the main control object holds a virtual item. In order to reduce the rendering pressure of the GPU, the model of the virtual item held by the main control object can be replaced with an integrated item model. Illustratively, if the main control object holds a virtual firearm, the virtual firearm also includes at least two item component models, and the model of the virtual firearm needs to be replaced with an integrated firearm model in order to render a firearm projection. As shown in FIG. 13, the firearm model including at least two item component models is replaced with an integrated firearm model 1301.

Step 1404: the integrated projection model is rendered to obtain the projection of the main control object.

In some embodiments, the projection of the main control object is a projection on the backlight side in the virtual environment. Illustratively, the projection of the main control object is a projection on the ground in the virtual environment, or the projection of the main control object is a projection on a wall in the virtual environment, or the projection of the main control object is a projection on a ceiling in the virtual environment.

In some embodiments, the projection of the main control object can also refer to an image on a reflecting surface. For example, the projection of the main control object refers to an image of the main control object on a mirror surface, and for example, the projection of the main control object refers to an image of the main control object on a water surface.

To sum up, in the embodiment of this application, when the projection of the main control object is generated, the original bone model is extracted from the animation blueprint to obtain the projection of the main control object before the second bone deformation processing, so as to ensure that the generated projection shape is correct. Compared with the related art, which uses two sets of different animation blueprints to obtain the and the projection of the main control object at the same time, the method can obtain the projection of the main control object without setting an additional set of animation blueprint, can simplify the process of obtaining the projection of the main control object, can obtain the projection of the main control object without excessive calculation amount, and reduces the calculation pressure of computer device.

In addition, the projection model is replaced with an integrated projection model, which reduces the number of committing renderings of computer device and reduces the working pressure of the GPU.

In the following embodiments, the method of adjusting the posture of the original bone model referred to in the above step 902 or step 1402 is briefly introduced. The embodiment of this application is described by taking reverse dynamics as an example. It should be noted that, the posture of the original bone model may also be adjusted by other methods which are not specifically limited in this application.

Figure 15:
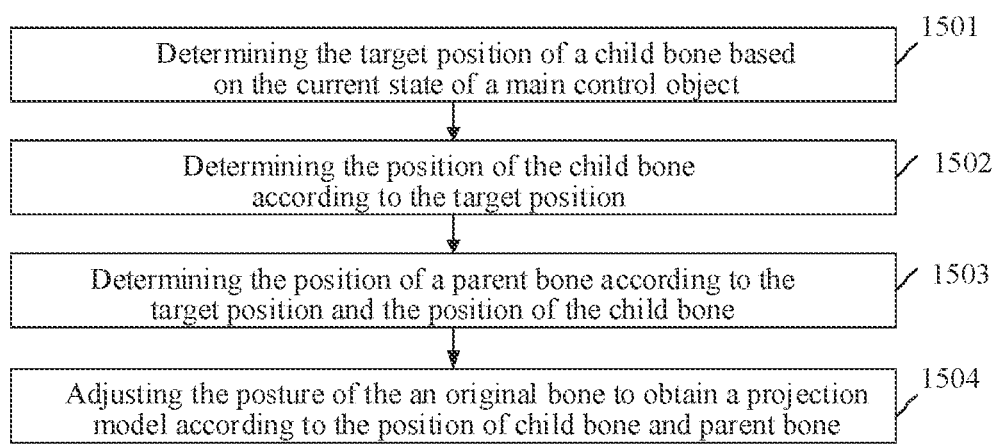
FIG. 15 is a schematic flowchart of a method for adjusting a posture of an original bone model according to an exemplary embodiment of this application.

FIG. 15 shows a schematic flowchart of a method for adjusting a posture of an original bone model according to an exemplary embodiment of this application. The method may be performed by the terminal 120 shown in FIG. 1 and the method shown in FIG. 15 is used to further fine-tune the original bone model to improve the accuracy of the projected model. Taking the main control object in a walking state as an example, the model of the main control object needs to realize the coordination and linkage of feet and legs, while the projection model of the main control object does not need to distinguish feet and legs under the condition of low accuracy requirement, and the projection model needs to distinguish feet and legs under the condition of high accuracy requirement, and the movement of legs is determined by the movement of feet in this application. The method shown in FIG. 15 includes the following steps:

Step 1501: based on the current state of the main control object, a target position of the child bone is determined.

The original bone model includes a child bone and a parent bone corresponding to the child bone and the child bone is located at the end of a bone chain. Taking the main control role as a human-shape role as an example, the child bone can be the hand of the human-shape role and the parent bone may be the arm of the human-shape role. The child bone can be the foot of the human-shape role and the parent bone is the leg of the human-shape role.

In some embodiments, the current state includes but is not limited to at least one of attacking, releasing skills, purchasing props, treating, adjusting body postures, crawling, walking, riding, flying, jumping, driving, picking, shooting, throwing, running and resting.

The target position is a position that the child bone needs to reach in the current state. Illustratively, if the main control object is in a walking state, the child bone refers to the foot of the main control object and the foot of the main control object is in a raised state, the target position is the landing point of the foot of the main control object. Illustratively, if the main control object is walking on a staircase holding a railing, the child bone refers to the hand of the main control object, and the hand of the main control object is in a raised state, the target position is the landing point of the hand of the main control object.

Step 1502: according to the target position, the position of the child bone is determined.

Illustratively, determining the position of the child bone includes the following sub-steps:

Indicatively, the main control object is in a walking state, and the walking state can be simply divided into a raised state and a falling state. Taking the lifting state at this time as an example, the step 1502 is used to determine the position of the foot (child bone) in the falling state.

1. A First Vector from a First End Point of the Child Bone to an End of the Child Bone is Determined.

The first end point of the child bone is an end point on the child bone far away from the end of the child bone. Illustratively, as shown in FIG. 16, the first vector is a vector represented by the first end point 1603 of the child bone 1602 to the end 1605 of the child bone.

Indicatively, the child bone is the foot, the first end point is the heel of the foot, and the end of the child bone is the toe of the foot. In sub-step 1, a first vector pointing from the heel to the toe in the raised state is obtained.

2. A Second Vector from the First End Point to the Target Position is Determined.

Figure 16:
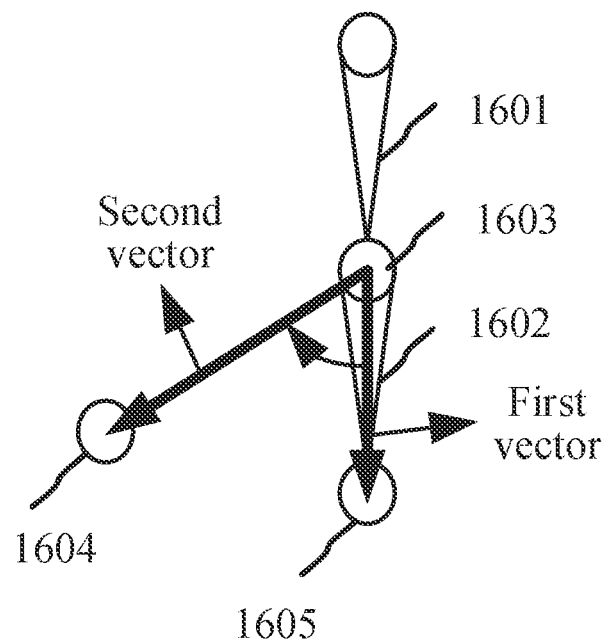
FIG. 16 is a schematic diagram of adjusting a child bone according to an exemplary embodiment of this application.

Illustratively, as shown in FIG. 16, the second vector is a vector represented by the first end point 1603 to the target position 1604.

Indicatively, the first end point is the heel of the foot and the target position is the target landing position of the toe. In sub-step 2, a second vector pointing from the heel to the target landing position in the raised state.

3. Based on the Included Angle Between the First Vector and the Second Vector, the Child Bone is Rotated to Determine the Position of the Child Bone.

Illustratively, as shown in FIG. 16, based on the included angle between the first vector and the second vector, the child bone 1602 is rotated counterclockwise at the same rotation angle as the included angle to obtain the position of the child bone 1602.

Indicatively, the first vector refers to a vector in which the heel points to the toe in the raised state and the second vector refers to a vector in which the heel points to the target position in the raised state. Sub-step 3 is to rotate the foot (child bone) based on the included angle between the first vector and the second vector to obtain a rotated foot, that is, to obtain a foot in the falling state.

Step 1503: according to the target position and the position of the child bone, the position of the parent bone is determined.

Illustratively, determining the position of the parent bone includes the following sub-steps:

1. A Third Vector from a Second End Point of the Parent Bone to the End of the Child Bone.

The second end point of the parent bone is an end point on the parent bone far away from the child bone. Illustratively, as shown in FIG. 17, the third vector is a vector represented by the second end point 1606 of the parent bone 1601 to the end 1605 of the child bone.

Indicatively, the parent bone is the calf, the second end point is the knee, and the end of the child bone is the toe. In sub-step 1, the third vector from the knee to the toe (before the rotation) in the raised state is obtained.

2. A Fourth Vector from the Second End Point to the Target Position is Determined.

Figure 17:
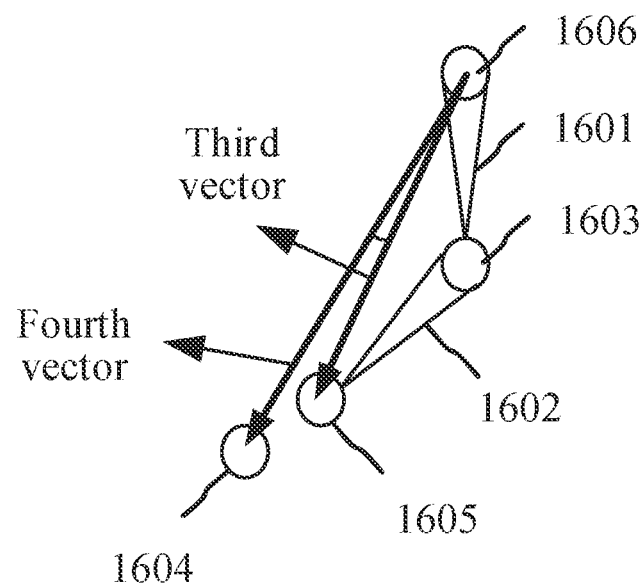
FIG. 17 is a schematic diagram of adjusting a parent bone according to an exemplary embodiment of this application.

Illustratively, as shown in FIG. 17, the fourth vector is a vector represented by the second end point 1606 to the target position 1604.

Indicatively, the target position is the target landing position of the toe and the second end point is the knee. In sub-step 2, the fourth vector pointing from the knee to the target landing position is obtained.

3. Based on the Included Angle Between the Third Vector and the Fourth Vector, the Parent Bone is Rotated to Determine the Position of the Parent Bone.

Illustratively, as shown in FIG. 17, based on the included angle between the third vector and the fourth vector, the parent bone 1601 is rotated counterclockwise at the same rotation angle as the included angle to obtain the position of the parent bone 1601.

Indicatively, the third vector refers to a vector in which the knee points to the toe in the raised state and the fourth vector refers to a vector in which the knee points to the target position in the raised state. Sub-step 3 is to rotate the calf (parent bone) based on the included angle between the third vector and the fourth vector to obtain the rotated calf, that is, to obtain the calf in the falling state.

Step 1504: According to the position of child bone and parent bone, the posture of an original bone model is adjusted to obtain the projection model.

When the positions of the child bone and the parent bone are known, the original bone model can be adjusted according to the positions of the child bone and the parent bone, so as to complete the posture adjustment of the original bone model.

To sum up, the embodiment of this application provides a method for adjusting the posture of the original bone model. The method can adjust the posture of the original bone model, so that the action and posture of the main control object fit the current state and the posture of the original bone model is closer to the actual situation, thus obtaining the state of the main control object that can be better reflected by the projection model.

Figure 18:
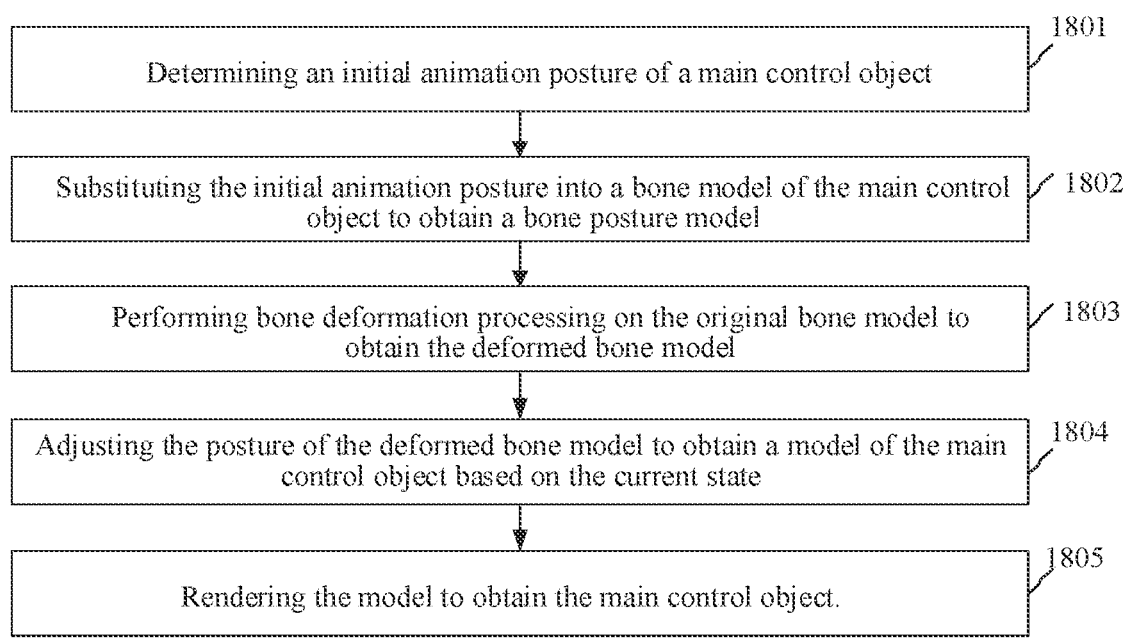
FIG. 18 is a schematic flowchart of an implementation method for an animation blueprint according to an exemplary embodiment of this application.

In a specific embodiment, an implementation method of an animation blueprint is provided. FIG. 18 shows a schematic flowchart of an implementation method of the animation blueprint according to an embodiment of this application. The method may be performed by the terminal 120 shown in FIG. 1, the method including the following steps:

Step 1801: an initial animation posture of the main control object is determined.

In some embodiments, the initial animation posture is determined according to the current state of the main control object.

In some embodiments, the bone model of the main control object includes at least two component models and the at least two component models include models of different parts on the main control object. For example, the bone model of the main control object includes an upper body model and a lower body model. When determining the initial animation posture, it is necessary to determine the animation postures of at least two component models sequentially. The animation postures of the at least two component models are superimposed to obtain the initial animation posture. Illustratively, when the main control object runs while shooting, it is necessary for the upper body of the main control object to match the animation posture of shooting and the lower body of the main control object to match the animation posture of running, and the animation postures of the upper body and the lower body are superimposed together to obtain the initial animation posture of the main control object.

Step 1802: the original bone model is obtained by substituting the initial animation posture into the bone model of the main control object.

In some embodiments, according to the initial animation posture, the bone model of the main control object is adjusted to obtain the original bone model.

Figure 19:
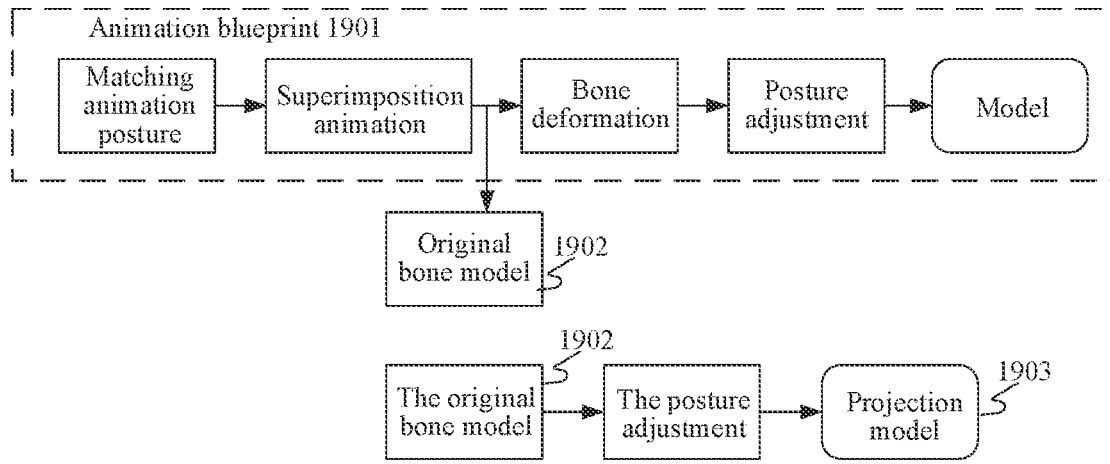
FIG. 19 is a schematic diagram of an implementation method of an animation blueprint according to an exemplary embodiment of this application.

Illustratively, as shown in FIG. 19, after the original bone model 1902 extracted from the animation blueprint 1901 is subjected to posture adjustment, the projection model 1903 may be obtained and the projection model 1903 is used to generate the projection of the main control object in the virtual environment.

Step 1803: Bone deformation processing is carried out on the original bone model to obtain the deformed bone model.

Illustratively, first bone deformation processing is carried out on the original bone model to obtain the deformed bone model. The first bone deformation processing is performed to scale a bone at an overlap region of a camera model and the original bone model of the main control object. For example, the bone of the head region of the main control object is scaled.

Illustratively, second bone deformation processing is carried out on the original bone model to obtain the deformed bone model. The second bone deformation processing is used to distort the original bone model when the main control object is in the target current state. For example, when the main control object leans to the left and right, the bone model of the main control object may be distorted excessively.

Step 1804: based on the current state, the posture of the original bone model after bone deformation is adjusted to obtain the model of the main control object.

In some embodiments, based on the current state, the posture of the original bone model after bone deformation is adjusted by reverse dynamics to obtain the model of the main control object.

It should be noted that, IK (Inverse Kinematics and AO (Aim Offset) are both time-dependent on the bone deformation processing. For example, a part of IK operations need to be performed after the bone deformation processing, another part of IK operations need to be performed before the bone deformation processing, and another part of IK operations may be performed before the bone deformation processing or before bone deformation. Among them, IK and AO depend on specific projects for bone deformation processing.

Step 1805: the model is rendered to obtain the main control object.

In some embodiments, the model includes at least two component models, and the at least two component models include models of different parts on the main control object. Such as a head model, a torso model, an upper limb model, and a lower limb model included in the model. When the model is rendered, it is necessary to render at least two component models respectively and rendering results of at least two component models are obtained. The rendering results of the at least two component models are synthesized to obtain the of the main control object. Illustratively, the head model, the torso model, the upper limb model, and the lower limb model are rendered respectively to obtain corresponding rendering results of the head model, the torso model, the upper limb model, and the lower limb model and the four rendering results are synthesized to obtain the of the main control object.

In summary, the embodiment provides a method for an animation blueprint, which can obtain the of a main control object. In addition, the original bone model in the animation blueprint can be used to obtain the projection of the main control object.

In another embodiment of this application, at least some of the steps occurring after the bone deformation processing in the animation blueprint in other embodiments are arranged to be carried out before the bone deformation processing as much as possible. In a specific embodiment, another implementation method of the animation blueprint is provided. In the specific implementation, the steps occurring after the bone deformation processing can be moved to the bone deformation pre-process without affecting the of the main control object. For example, in the embodiment shown in FIG. 18, the operation corresponding to step 1804 is performed before step 1803.

Figure 20:
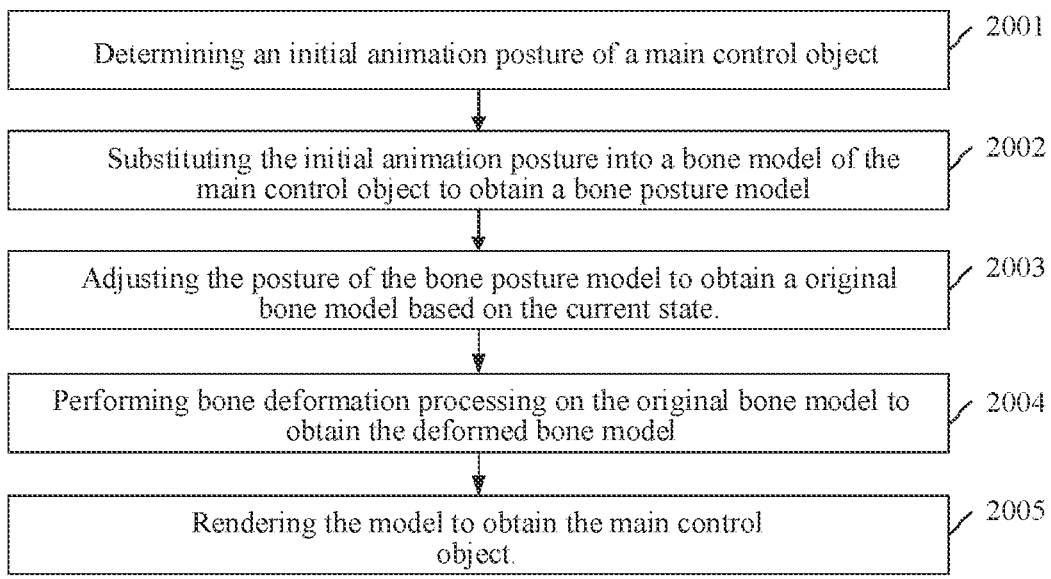
FIG. 20 is a schematic flowchart of an implementation method of an animation blueprint according to an exemplary embodiment of this application.

FIG. 20 shows a schematic flowchart of an implementation method of an animation blueprint according to an embodiment of this application. The method may be performed by the terminal 120 shown in FIG. 1, the method including the following steps:

Step 2001: an initial animation posture of the main control object is determined.

In some embodiments, the initial animation posture is determined according to the current state of the main control object.

In some embodiments, the bone model of the main control object includes at least two component models, and the at least two component models include models of different parts on the main control object. For example, the bone model of the main control object includes an upper body model and a lower body model. When determining the initial animation posture, it is necessary to determine the animation postures of at least two component models sequentially. The animation postures of the at least two component models are superimposed to obtain the initial animation posture. Illustratively, when the main control object runs while shooting, it is necessary for the upper body of the main control object to match the animation posture of shooting and the lower body of the main control object to match the animation posture of running, and the animation postures of the upper body and the lower body are superimposed together to obtain the initial animation posture of the main control object.

Step 2002: the initial animation posture is substituted into the bone model of the main control object to obtain the bone posture model.

In some embodiments, according to the initial animation posture, the bone of the main control object is adjusted to obtain the bone posture model.

Step 2003: Based on the current state, the posture of the bone posture model is adjusted to obtain the original bone model.

In some embodiments, based on the current state, the posture of the bone posture model is adjusted by reverse dynamics to obtain the original bone model.

Figure 21:
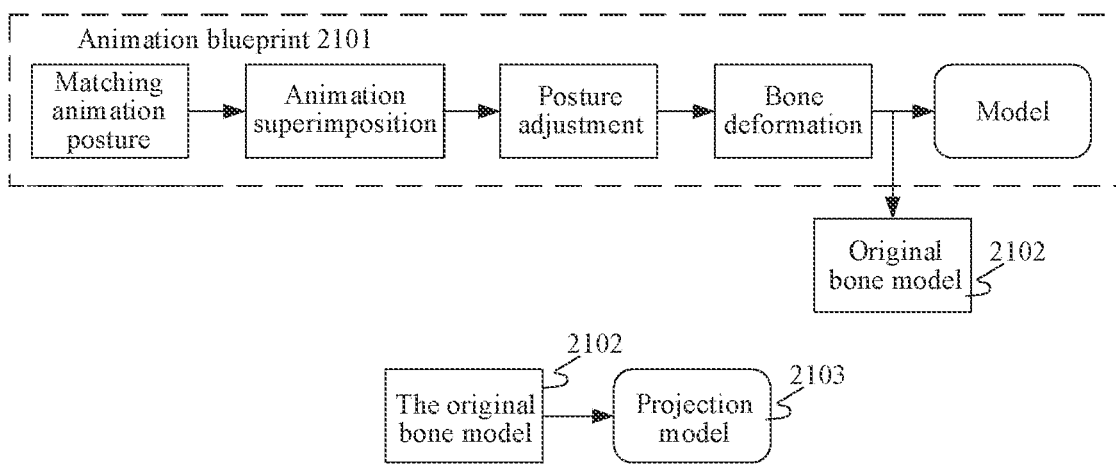
FIG. 21 is a schematic diagram of an implementation method of an animation blueprint according to an exemplary embodiment of this application.

Illustratively, as shown in FIG. 21, the original bone model 2102 extracted from the animation blueprint 2101 has been adjusted in posture, so that the original bone model 2102 can be directly used as the projection model 2103, which is used to generate a projection of the main control object in the virtual environment.

Step 2004: Bone deformation processing is carried out on the original bone model to obtain the deformed bone model.

Illustratively, first bone deformation processing is carried out on the original bone model to obtain the deformed bone model. The first bone deformation processing is performed to scale a bone at an overlap region of the camera model and the original bone model of the main control object. For example, the bone of the head region of the main control object is scaled.

Illustratively, second bone deformation processing is carried out on the original bone model to obtain the deformed bone model. The second bone deformation processing is used to distort the original bone model when the main control object is in the target current state. For example, when the main control object leans to the left and right, the bone model of the main control object may be distorted excessively.

Step 2005: the model is rendered to obtain the main control object.

In some embodiments, the model includes at least two component models, and the at least two component models include models of different parts on the main control object. Such as a head model, a torso model, an upper limb model, and a lower limb model included in the model. When the model is rendered, it is necessary to render at least two component models respectively and rendering results of at least two component models are obtained. The rendering results of the at least two component models are synthesized to obtain the of the main control object. Illustratively, the head model, the torso model, the upper limb model, and the lower limb model are rendered respectively to obtain corresponding rendering results of the head model, the torso model, the upper limb model, and the lower limb model and the four rendering results are synthesized to obtain the of the main control object.

It should be noted that, In the embodiment of this application, the operation after the bone deformation processing is performed before the bone deformation processing, but there is a premise that after the operation after the bone deformation processing is performed before the bone deformation processing, the and/or projection of the main control object are not affected. Among them, the operation after the bone deformation processing which can be moved is determined by the actual requirement. Illustratively, in the actual requirement A, the operation of the posture adjustment can be moved to be performed before the bone deformation processing. However, in the actual requirement B, the operation of the posture adjustment cannot be moved to be performed before the bone deformation processing. In this application, the operation that can be moved to be performed before the bone deformation treatment is not specifically limited.

In summary, the embodiment provides a method for an animation blueprint, which can obtain the of a main control object. In addition, the original bone model in the animation blueprint can be used to obtain the projection of the main control object.

In a specific example, it is illustrated as applied in a shooting game.

Figure 22:
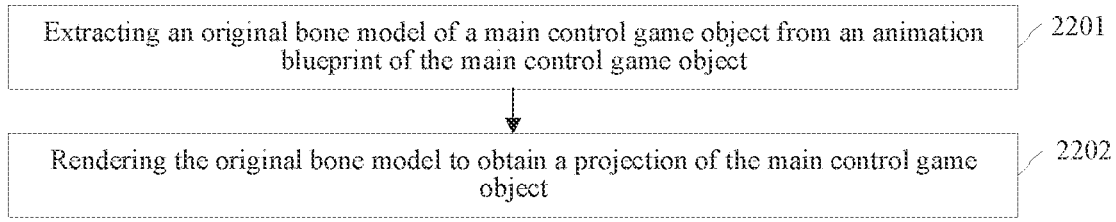
FIG. 22 is a schematic diagram of a method for rendering a projection of a main control object in a virtual environment according to an exemplary embodiment of this application.

FIG. 22 shows a schematic flowchart of a method for rendering a projection of a main control object in a virtual environment according to an embodiment of this application. The method may be performed by the terminal 120 shown in FIG. 1, the method including the following steps:

Step 2201: the original bone model of a main control game object is extracted from the animation blueprint of the main control game object.

The main control game object is at least one of virtual characters, virtual animals and cartoon characters. In this application, this is not specifically limited.

The original bone model is a model of the main control game object without bone deformation.

The animation blueprint is a process of generating an of a main control object in a virtual environment. The of the main control object can be obtained through the animation blueprint. The of main control object refers to the main control object in the virtual environment.

In an alternative embodiment, the animation blueprint includes bone deformation processing. Before the bone deformation processing of the animation blueprint, the original bone model is extracted from the animation blueprint.

In an alternative embodiment, the bone deformation processing includes first bone deformation processing, which is performed to scale a bone at an overlap region of the camera model and the original bone model of the main control object. Before the first bone deformation of the animation blueprint, the original bone model is extracted from the animation blueprint.

In an alternative embodiment, the bone deformation processing includes second bone deformation processing, which is used to distort the original bone model when the main control object is in the target current state; Before the second bone deformation processing of the animation blueprint, the original bone model is extracted from the animation blueprint.

Step 2202: the original bone model is rendered to obtain the projection of the main control game object.

In some embodiments, the projection of the main control game object is a projection on the backlight side in the virtual environment. Illustratively, the projection of the main control game object is a projection on the ground in the virtual environment, or the projection of the main control game object is a projection on a wall in the virtual environment, or the projection of the main control game object is a projection on a ceiling in the virtual environment.

In some embodiments, the projection of the main control game object can also refer to an image on a reflecting surface. For example, the projection of the main control game object refers to an image of the main control game object on a mirror surface, and for example, the projection of the main control game object refers to an image of the main control game object on a water surface.

In some embodiments, before rendering the original bone model, the posture of the original bone model is adjusted by reverse dynamics, and the bone model after posture adjustment is obtained. The bone model after the posture adjustment is rendered to obtain the projection of the main control game object. In some embodiments, before rendering the original model, based on the current state of the main control game object, the posture of the original bone model is adjusted to obtain the projection model. The bone model after the posture adjustment is rendered to obtain the projection of the main control game object.

In an alternative embodiment, the original bone model includes a child bone and a parent bone corresponding to the child bone and the child bone is located at the end of a bone chain; Based on the current state of the main control game object, the target position of the child bone is determined; The position of the child bone is determined according to the target position; The position of the parent bone is determined according to the target position and the position of the child bone; According to the position of child bone and parent bone, the posture of the original bone model is adjusted to obtain the projection model.

In an alternative embodiment, a first vector is determined from a first end point of the child bone to an end of the child bone and the first end point of the child bone is an end point on the child bone far away from the end of the child bone; A second vector from the first end point to the target position is determined; Based on the included angle between the first vector and the second vector, the child bone is rotated to determine the position of the child bone.

In an alternative embodiment, a third vector is determined from a second end point of the parent bone to an end of the child bone and the second end point of the parent bone is an end point on the parent bone far away from the child bone;

A fourth vector from the second end point to the target position is determined; Based on the included angle between the third vector and the fourth vector, the parent bone is rotated to determine the position of the parent bone.

In an alternative embodiment, the model includes at least two component models and the at least two component models include models of different parts on the main control game object; The projection model is replaced with an integrated projection model, the integrated projection model is a low-surface model after merging at least two component models, and the number of surfaces of the integrated projection model is smaller than the number of surfaces of the projection model; The integrated projection model is rendered to obtain the projection of the main control game object.

In an alternative embodiment, the animation blueprint includes the following steps:

1. an initial animation posture of the main control game object is determined;
2. the original bone model is obtained by substituting the initial animation posture into the bone model of the main control game object.
3. bone deformation processing is carried out on the original bone model to obtain the deformed bone model.
4. based on the current state, the posture of the original bone model after bone deformation is adjusted to obtain the model of the main control game object and the model is a model used to generate the of the main control game object;
5. the model is rendered to obtain the of the main control game object.

In an alternative embodiment, the bone model of the main control game object includes at least two component models, the at least two component models including models of different parts on the main control game object; An initial animation posture of the main control game object is determined, including: animation postures of at least two component models are determined sequentially; The animation postures of the at least two component models are superimposed to obtain the initial animation posture.

In an alternative embodiment, the model includes at least two component models and the at least two component models include models of different parts on the main control game object; The model is rendered to obtain the of the main control game object, including: at least two component models are rendered respectively to obtain rendering results of the at least two component models; The rendering results of the at least two component models are synthesized to obtain the of the main control game object.

To sum up, in the embodiment of this application, when the projection of the main control game object is generated, only original bone model is needed to extract from the animation blueprint, so that the projection of the main control object can be obtained according to the original bone model. The method can obtain the projection of the main control object without setting an additional set of animation blueprints, can simplify the process of obtaining the projection of the main control object, can obtain the projection of the main control object without excessive calculation amount, reduces the calculation pressure of the computer device, and can complete the projection of the main control object even if the calculation capability of the computer device is weak.

The following is embodiments of the apparatus of this application, which can be used to perform the embodiments of the method of this application. For details not disclosed in the embodiments of the apparatus of this application, reference is made to the embodiments of the method of this application.

Figure 23:
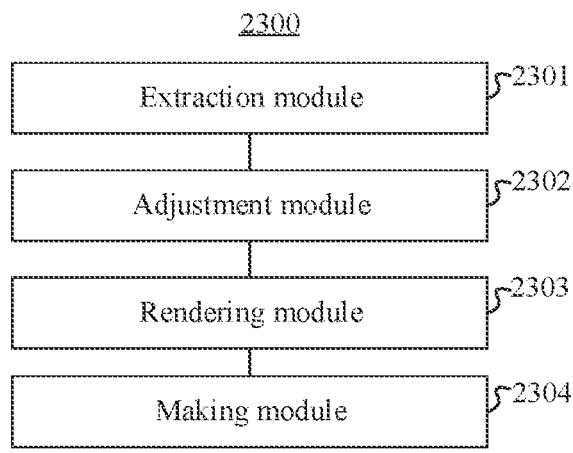
FIG. 23 is a schematic structural diagram of an apparatus for rendering a projection of a main control object in a virtual environment according to an exemplary embodiment of this application.

Referring to FIG. 23, a block diagram of an apparatus for rendering a projection of a main control object in a virtual environment according to one embodiment of this application is shown. The above functions can be implemented by hardware or by hardware executing corresponding software. The Apparatus 2300 includes:

an extraction module 2301, configured to extract an original bone model of the main control object from an animation blueprint of the main control object, where the main control object is an object that observes a virtual environment from a first-person perspective, the animation blueprint is used for generating a model of the main control object in the virtual environment, and the original bone model is a model of the main control object without bone deformation;

an adjustment module 2302, configured to obtain a projection model based on the original bone model, where the projection model is a model for generating a projection of the main control object in the virtual environment;

a rendering module 2303, configured to render the projection model to obtain the projection of the main control object.

In an alternative design of this application, the animation blueprint includes bone deformation processing; the extraction module 2301 is further configured to extract the original bone model from the animation blueprint before the bone deformation processing of the animation blueprint.

In an alternative design of this application, the bone deformation processing includes first bone deformation processing, which is performed to scale a bone at an overlap region of a camera model and the original bone model of the main control object. The extraction module 2301 is further used to extract the original bone model from the animation blueprint before the first bone deformation processing of the animation blueprint.

In an alternative design of this application, the bone deformation processing includes second bone deformation processing, which is used to distort the original bone model when the main control object is in the target current state; The extraction module 2301 is further used to extract the original bone model from the animation blueprint before the second bone deformation processing of the animation blueprint.

In an alternative design of this application, the adjustment module 2302 is used to determine the original bone model as a projection model.

In an alternative design of this application, the adjustment module 2302 is used to adjust the posture of the original bone model based on the current state of the main control object to obtain the projection model.

In an alternative design of this application, the original bone model includes a child bone and a parent bone corresponding to the child bone and the child bone is located at the end of a bone chain; The adjustment module 2302 is further used to determine a target position of the child bone based on the current state of the main control object; The position of the child bone is determined according to the target position; The position of the parent bone is determined according to the target position and the position of the child bone; According to the position of child bone and parent bone, the posture of original bone model is adjusted to obtain the projection model.

In an alternative design of this application, the adjustment module 2302 is further used to determine a first vector from a first end point of the child bone to an end of the child bone and the first end point of the child bone is an end point on the child bone far away from the end of the child bone; A second vector from the first end point to the target position is determined; Based on the included angle between the first vector and the second vector, the child bone is rotated to determine the position of the child bone.

In an alternative design of this application, the adjustment module 2302 is further used to determine a third vector from a second end point of the parent bone to an end of the child bone and the second end point of the parent bone is an end point on the parent bone far away from the child bone; A fourth vector from the second end point to the target position is determined; Based on the included angle between the third vector and the fourth vector, the parent bone is rotated to determine the position of the parent bone.

In an alternative design of this application, the model includes at least two component models and at least two component models include models of different parts on the main control object. The rendering module 2303 is further used to replace the projection model with an integrated projection model, where the integrated projection model is a low-plane model after merging at least two component models and the number of faces of the integrated projection model is smaller than the number of faces of the projection model; The integrated projection model is rendered to obtain the projection of the main control object.

In an alternative design of this application, the apparatus further includes a fabrication module 2304;

The making module 2304 is used to determine an initial animation posture of the main control object; The original bone model is obtained by substituting the initial animation posture into the bone model of the main control game object. Bone deformation processing is carried out on the original bone model to obtain the deformed bone model. Based on the current state, the posture of the original bone model after bone deformation is adjusted to obtain the model of the main control object and the model is a model used to generate the of the main control object; The model is rendered to obtain the of the main control object.

In an alternative design of this application, the bone model of the main control object includes at least two component models, the at least two component models including models of different parts of the main control object; The making module 2304 is further used to determine animation postures of at least two component models sequentially; The animation postures of the at least two component models are superimposed to obtain an initial animation posture.

In an alternative design of this application, the model includes at least two component models, the at least two component models including models of different parts on the main control object; The Making Module 2304 is further used to respectively render the at least two component models to obtain rendering results of the at least two component models; The rendering results of the at least two component models are synthesized to obtain the of the main control object.

To sum up, in the embodiment, when the projection of the main control object is generated, the original bone model is extracted from the animation blueprint to obtain the projection of the main control object according to the original bone model. The method can obtain the projection of the main control object without setting an additional set of animation blueprints, can simplify the process of obtaining the projection of the main control object, can obtain the projection of the main control object without excessive calculation amount, and reduces the calculation pressure of the computer device.

Figure 24:
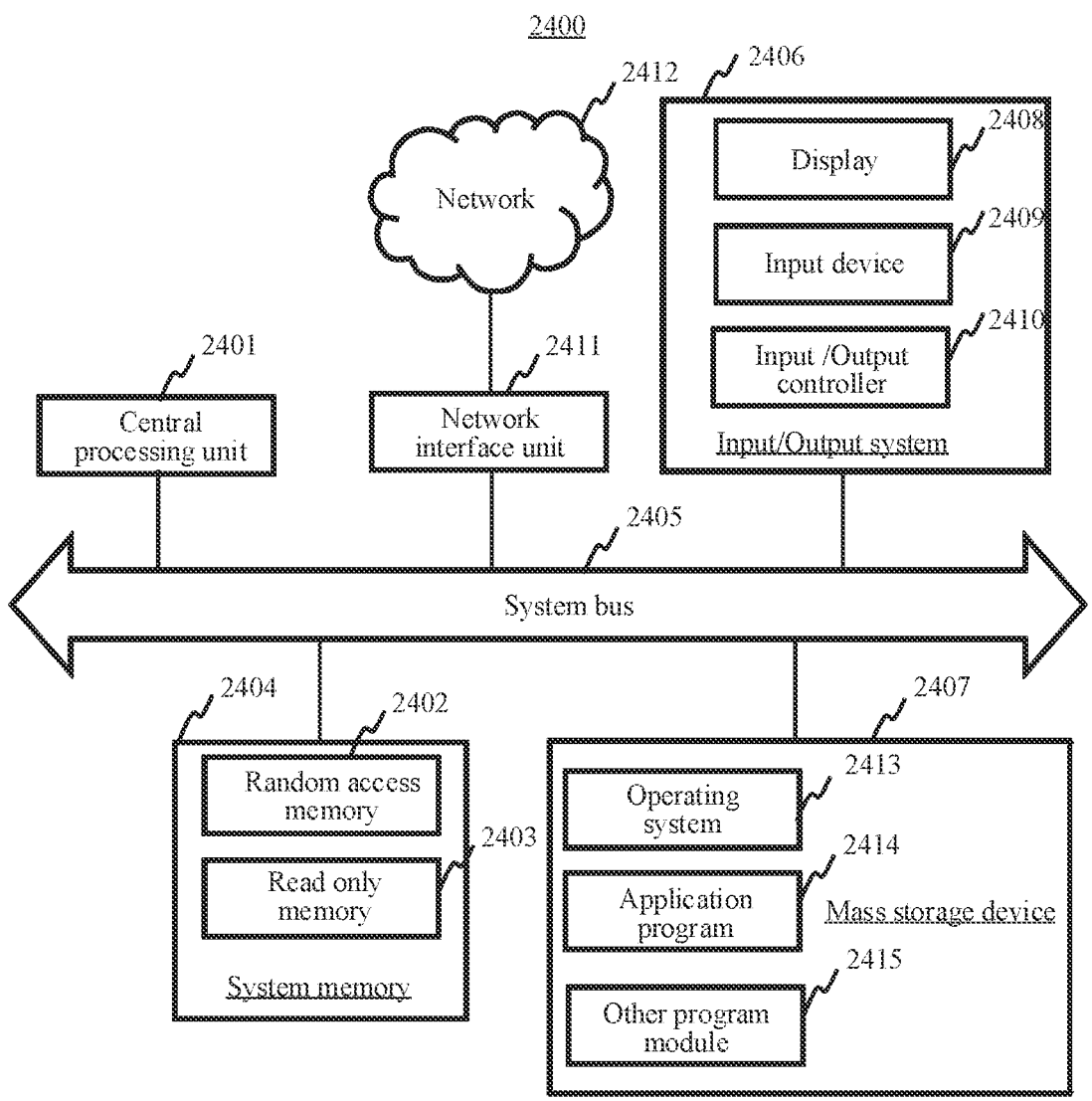
FIG. 24 is a schematic structural diagram of a computer device according to an exemplary embodiment of this application.

FIG. 24 is a schematic structural diagram of a computer device according to an exemplary embodiment. The computer device 2400 includes a Central Processing Unit (CPU) 2401, a system memory 2404 including a Random Access Memory (RAM) 2402 and a Read-Only Memory (ROM) 2403, and a system bus 2405 connecting the system memory 2404 and the Central Processing Unit 2401. The computer device 2400 also includes a basic Input/Output system (I/O system) 2406 for facilitating information transfer between various devices within the computer device, and a mass storage device 2407 for storing an operating system 2413, application programs 2414, and other program modules 2415.

The basic input/output system 2406 includes a display 2408 for displaying information and an input device 2409 such as a mouse, keyboard, or the like for a user to input information. The display 2408 and the input device 2409 are both connected to the central processing unit 2401 through an input-output controller 2410 connected to the system bus 2405. The basic input/output system 2406 may also include the input-output controller 2410 for receiving and processing input from a plurality of other devices such as a keyboard, a mouse, an electronic stylus. Similarly, the input-output controller 2410 also provides output to a display screen, printer or other type of output device.

The mass storage device 2407 is connected to the central processing unit 2401 through a mass storage controller (not shown) connected to the system bus 2405. The mass storage device 2407 and its associated computer device readable medium provide non-transitory storage for the computer device 2400. That is the mass storage device 2407 may include a computer device readable medium (not shown) such as a hard disk or a Compact Disc Read-Only Memory (CD-ROM) drive.

Without losing generality, the computer device readable medium may include a computer device storage medium and a communication medium. The computer device storage medium includes volatile and non-transitory, removable and non-removable medium implemented in any method or technology for storing information such as computer device readable instructions, data structures, program modules, or other data. The computer device storage medium includes RAM, ROM, Erasable Programmable Read Only Memory (EPROM), Electrically Erasable Programmable Read-Only Memory (EEPROM), CD-ROM, Digital Video Disc (DVD) or other optical storage, magnetic tape cassettes, magnetic tape, magnetic disk storage or other magnetic storage devices. Of course those skilled in the art appreciate that the computer device storage medium is not limited to the foregoing types. The system memory 2404 and the mass storage device 2407 described above may be collectively referred to as memory. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules or units. Moreover, each module can be part of an overall module that includes the functionalities of the module.

According to various embodiments of the present disclosure, the computer device 2400 may also operate as a remote computer device connected to a network through a network, such as the Internet. That is, the computer device 2400 may be connected to a network 2411 through a network interface unit 2412 connected to the system bus 2405, or may be connected to other types of networks or remote computer device systems (not shown) by using the network interface unit 2412.

The memory further includes one or more programs and the one or more programs are stored in the memory. By executing the one or more programs, the CPU 2401 implements all or part of the steps of the method for generating the main control object projection.

In an exemplary embodiment, a non-transitory computer-readable storage medium is also provided. The computer-readable storage medium stores at least one instruction, at least one program, a code set, or an instruction set, the at least one instruction, the at least one program, the code set, or the instruction set being loaded and executed by a processor to implement the method for generating a main object projection provided by the respective method embodiments described above.

This application also provides a non-transitory computer-readable storage medium. The storage medium stores at least one instruction, at least one program, a code set or an instruction set, the at least one instruction, the at least one program, the code set or the instruction set being loaded and executed by the processor to implement the method for generating the main control object projection provided by the foregoing method embodiment.

This application also provides a computer program product or computer program, the computer program product or computer program including computer instructions and the computer instructions stored in a non-transitory computer-readable storage medium. A processor of a computer device reads the computer instructions from the computer-readable storage medium, and the processor executes the computer instructions so that the computer device executes the method for rendering a projection of a main control object in a virtual environment as provided in the above embodiment.

What is claimed is:

1. A method for rendering a projection of a main control object in a virtual environment performed by a computer device, the method comprising:
   obtaining an original bone model of the main control object from an animation blueprint of the main control object;
   obtaining a projection model based on the original bone model and a posture of the main control object;
   generating a projection of the main control object in the virtual environment based on the projection model; and
   rendering the projection of the main control object in the virtual environment.

2. The method according to claim 1, further comprising:
   deforming the original bone model of the main control object to obtain a deformed bone model of the main control object; and
   rendering the main control object based on the deformed bone model and a position of a virtual camera.

3. The method according to claim 1, wherein the main control object is an object that observes the virtual environment from a first-person perspective.

4. The method according to claim 1, wherein the original bone model is a model of the main control object without bone deformation.

5. The method according to claim 1, wherein the obtaining an original bone model of the main control object from an animation blueprint of the main control object comprises:
   extracting the original bone model from the animation blueprint before bone deformation processing of the animation blueprint.

6. The method according to claim 1, wherein the obtaining a projection model based on the original bone model comprises:
   adjusting a posture of the original bone model based on a current state of the main control object, to obtain the projection model.

7. The method according to claim 1, wherein the model comprises at least two component models, and the at least two component models comprise models of different parts on the main control object; and
   the generating a projection of the main control object in the virtual environment based on the projection model comprises:
   replacing the projection model with an integrated projection model, wherein the integrated projection model is a low-surface model obtained by merging the at least two component models, and a number of surfaces of the integrated projection model is smaller than a number of surfaces of the projection model; and
   rendering the integrated projection model to obtain the projection of the main control object.

8. The method according to claim 1, wherein the animation blueprint is configured to generate a model of the main control object by:
   determining an initial animation posture of the main control object;
   substituting the initial animation posture into a bone model of the main cannot object to obtain the original bone model;
   performing bone deformation processing on the original bone model; and
   adjusting a posture of the original bone model after the bone deformation based on a current state of the main control object, to obtain the model of the main control object.

9. A computer device, comprising: a processor and a memory, the memory storing at least one instruction, the at least one instruction being loaded and executed by the processor and causing the computer device to implement a method for rendering a projection of a main control object in a virtual environment including:
   obtaining an original bone model of the main control object from an animation blueprint of the main control object;
   obtaining a projection model based on the original bone model and a posture of the main control object;
   generating a projection of the main control object in the virtual environment based on the projection model; and
   rendering the projection of the main control object in the virtual environment.

10. The computer device according to claim 9, wherein the method further comprises:
    deforming the original bone model of the main control object to obtain a deformed bone model of the main control object; and
    rendering the main control object based on the deformed bone model and a position of a virtual camera.

11. The computer device according to claim 9, wherein the main control object is an object that observes the virtual environment from a first-person perspective.

12. The computer device according to claim 9, wherein the original bone model is a model of the main control object without bone deformation.

13. The computer device according to claim 9, wherein the obtaining an original bone model of the main control object from an animation blueprint of the main control object comprises:
   extracting the original bone model from the animation blueprint before bone deformation processing of the animation blueprint.

14. The computer device according to claim 9, wherein the obtaining a projection model based on the original bone model comprises:
   adjusting a posture of the original bone model based on a current state of the main control object, to obtain the projection model.

15. The computer device according to claim 9, wherein the model comprises at least two component models, and the at least two component models comprise models of different parts on the main control object; and
   the generating a projection of the main control object in the virtual environment based on the projection model comprises:
   replacing the projection model with an integrated projection model, wherein the integrated projection model is a low-surface model obtained by merging the at least two component models, and a number of surfaces of the integrated projection model is smaller than a number of surfaces of the projection model; and
   rendering the integrated projection model to obtain the projection of the main control object.

16. The computer device according to claim 9, wherein the animation blueprint is configured to generate a model of the main control object by:
   determining an initial animation posture of the main control object;
   substituting the initial animation posture into a bone model of the main control object to obtain the original bone model;
   performing bone deformation processing on the original bone model; and
   adjusting a posture of the original bone model after the bone deformation based on a current state of the main control object, to obtain the model of the main control object.

17. A non-transitory computer-readable storage medium, storing at least one piece of program code, the program code being loaded and executed by a processor of a computer device and causing the computer device to implement a method for rendering a projection of a main control object in a virtual environment including:
   obtaining an original bone model of the main control object from an animation blueprint of the main control object;
   obtaining a projection model based on the original bone model and a posture of the main control object;
   generating a projection of the main control object in the virtual environment based on the projection model; and
   rendering the projection of the main control object in the virtual environment.

18. The non-transitory computer-readable storage medium according to claim 17, wherein the method further comprises:
   deforming the original bone model of the main control object to obtain a deformed bone model of the main control object; and
   rendering the main control object based on the deformed bone model and a position of a virtual camera.

19. The non-transitory computer-readable storage medium according to claim 17, wherein the main control object is an object that observes the virtual environment from a first-person perspective.

20. The non-transitory computer-readable storage medium according to claim 17, wherein the original bone model is a model of the main control object without bone deformation.

* * * * *